United States Patent [19]

Toeniskoetter et al.

[11] 4,226,626
[45] * Oct. 7, 1980

[54] BINDER COMPOSITION CONTAINING ALCOHOL

[75] Inventors: Richard H. Toeniskoetter, Worthington; John J. Spiwak, Columbus, both of Ohio

[73] Assignee: Ashland Oil, Inc., Ashland, Ky.

[*] Notice: The portion of the term of this patent subsequent to May 16, 1995, has been disclaimed.

[21] Appl. No.: 865,079

[22] Filed: Dec. 27, 1977

Related U.S. Application Data

[63] Continuation of Ser. No. 455,474, Mar. 27, 1974, abandoned, which is a continuation-in-part of Ser. No. 351,903, Apr. 17, 1973, Pat. No. 3,923,525, and Ser. No. 415,852, Nov. 14, 1973, Pat. No. 3,930,872.

[51] Int. Cl.² .............................................. B28B 7/34
[52] U.S. Cl. .................................... 106/38.35; 106/85
[58] Field of Search ................... 106/38.35, 287 R, 85

[56] References Cited

U.S. PATENT DOCUMENTS

| | | | |
|---|---|---|---|
| 2,450,952 | 10/1948 | Greger | 106/35 |
| 3,899,342 | 8/1975 | Birchall et al. | 106/85 |
| 3,923,525 | 12/1975 | Toeniskoetter et al. | 106/38.3 |
| 3,923,534 | 12/1975 | Cassidy | 106/62 |
| 3,930,872 | 1/1976 | Toeniskoetter et al. | 106/38.3 |
| 3,966,482 | 6/1976 | Cassidy et al. | 106/85 |
| 4,010,294 | 3/1977 | Birchall et al. | 106/85 |
| 4,089,692 | 5/1978 | Toeniskoetter et al. | 106/38.35 |

FOREIGN PATENT DOCUMENTS

| | | |
|---|---|---|
| 48-25295 | 7/1973 | Japan . |
| 48-71442 | 9/1973 | Japan . |
| 7214144 | 4/1973 | Netherlands . |

*Primary Examiner*—Theodore Morris
*Attorney, Agent, or Firm*—Pollock, Vande Sande & Priddy

[57] ABSTRACT

A binder composition comprising aluminum phosphate, water, material containing an alkaline earth metal and an oxide, and certain solid polyhydric alcohols.

47 Claims, No Drawings

BINDER COMPOSITION CONTAINING ALCOHOL

This is a continuation of application Ser. No. 455,474 filed on Mar. 27, 1974, now abandoned, entitled "Binder Composition Containing Alcohol" which in turn is a continuation-in-part of application Ser. No. 351,903 entitled "Inorganic Binder for Foundry Shapes" and filed Apr. 17, 1973 now U.S. Pat. No. 3,923,525, and Ser. No. 415,852 entitled "Binder Composition" and filed November 14, 1973 now U.S. Pat. No. 3,930,872.

BACKGROUND OF THE INVENTION

The present invention relates to binder compositions and methods for curing such binder compositions. The binder compositions of the present invention are especially useful as molding compositions such as refractories, abrasive articles, and molding shapes such as foundry cores and molds. The binder compositions are capable of hardening at ambient temperatures.

Various binder systems now used including binders for molding compositions employ inorganic substances as the major components. However, prior art binders from inorganic substances have suffered from one or more deficiencies. Typical of the deficiencies exhibited by prior art inorganic binders including the silicates suggested for molding shapes such as cores and molds have been poor collapsibility of the shape and poor removal or "shake out" of the molding shape from the metal casting.

Also, many of the suggested inorganic binders exhibit inadequate bonding strength properties and/or undesirable cure characteristics.

Moreover, various prior art inorganic binders such as the silicates provide molding shapes and particularly ambient temperature cured shapes which possess poor scratch resistance at strip; and accordingly, such shapes require at least a few additional hours after strip time has been achieved to develop adequate scratch resistance. In view of the poor scratch resistance at strip, such shapes cannot be readily handled at strip because of the danger of damage to the shape. Moreover, the sag resistance at strip of the shapes prepared from various prior art binders is not good.

Another problem which may exist is the degradation of physical properties such as tensile strength and hardness of molded articles after storage for only a few hours.

It is therefore an object of the present invention to provide inorganic binder systems which possess acceptable strength characteristics. It is another object of the present invention to provide inorganic binder systems wherein the cure characteristics can be manipulated within certain limits.

It is a further object of the present invention to provide inorganic binder systems for molding shapes which possess relatively good collapsibility and shake out properties as compared to various other suggested inorganic binders.

It is another object of the present invention to provide molding shapes employing inorganic binders which possess good scratch and sag resistance at strip. Likewise, it is an object of the present invention to provide molding shapes from inorganic binder systems which can be readily and easily handled at strip.

It is also an object of the present invention to provide molded articles which demonstrate improved resistance to deterioration of physical properties such as tensile strength and hardness due to storage.

SUMMARY OF THE INVENTION

The present invention is concerned with binder compositions which comprise:
(A) aluminum phosphate containing boron in an amount up to about 40 mole % based upon the moles of aluminum and containing a mole ratio of phosphorus to total moles of aluminum and boron of about 2:1 to about 4:1,
(B) solid polyhydric alcohol being soluble in aqueous solutions of the aluminum phosphate, and containing at least two adjacent carbon atoms each having directly attached thereto one hydroxyl group; and keto tautomers thereof;
(C) alkaline earth metal material containing alkaline earth metal and an oxide; and
(D) water.

The amount of aluminum phosphate is from about 50 to about 95% by weight based upon the total weight of aluminum phosphate and alkaline earth material; and the amount of alkaline earth material is from about 50 to about 5% by weight based upon the total weight of aluminum phosphate and alkaline earth material. The amount of water is from about 15 to about 50% by weight based upon the total weight of aluminum phosphate and water. The amount of the polyhydric alcohol and/or keto tautomer thereof is from about 0.5 to about 25% by weight based upon the total weight of aluminum phosphate and polyhydric alcohol and/or keto tautomer.

The present invention is also concerned with compositions for the fabrication of molded articles such as refractories, abrasive articles such as grinding wheels, and shapes used for molding which comprise:
(A) a major amount of aggregate; and
(B) an effective bonding amount up to about 40% by weight of the aggregate of the binder composition defined above.

The present invention is also concerned with a process for casting of relatively low melting point non-ferrous type metal which comprises fabricating a shape from a composition which contains a major amount of aggregate and an effective bonding amount up to about 40% by weight of the aggregate of the binder composition defined above; pouring the relatively low melting point non-ferrous type metal while in the liquid state into the shape; allowing the non-ferrous type metal to cool and solidify; then contacting the shape with water in an amount and for a time sufficient to cause degradation of the bonding characteristics of the binder system; and separating the molded article.

DESCRIPTION OF PREFERRED EMBODIMENTS

The aluminum phosphate constituent of the binder system of the present invention is an aluminum phosphate which contains boron in an amount up to about 40 mole % based upon the moles of aluminum of the aluminum phosphate. Also, the aluminum phosphate contains a mole ratio of phosphorous to total moles of aluminum and boron of about 2:1 to about 4:1 and preferably from about 2.5:1 to about 3.5:1 and more preferably from about 2.8:1 to about 3.2:1.

Any of the several known methods may be employed to produce an aluminum phosphate suitable for the present purposes. In particular those methods wherein the aluminum oxide containing reactant is completely dissolved are preferred.

The aluminum phosphate also is preferably prepared from either $P_2O_5$ or concentrated phosphoric acid of from about 70 to about 86% by weight $H_3PO_4$ concentration. The preferred phosphoric acid solutions contain about 80 to about 86% by weight of $H_3PO_4$. Of course, other sources of phosphorus such as polyphosphoric acids, can be employed, if desired.

The amount of aluminum phosphate employed in the binder system is from about 50 to about 95% by weight and preferably from about 65 to about 90% by weight based upon the total weight of aluminum phosphate and alkaline earth material, and the amount of alkaline earth material is from about 5 to about 50% and preferably from about 10 to about 35% by weight based upon the total weight of aluminum phosphate and alkaline earth material.

The preferred aluminum phosphates employed in the present invention contain boron. Usually the boronated aluminum phosphates are prepared from boric acid and/or boric oxide and/or metallic borates such as alkali metal borates which include sodium borate ($Na_2B_4O_7.10H_2O$). These preferred aluminum phosphates are preferably, but not necessarily, prepared by reacting together the phosphoric acid or $P_2O_5$; and alumina such as alumina trihydrate ($Al_2O_3.3H_2O$); and boric acid or boric oxide. It is preferred to use boric acid rather than boric oxide since the acid is in a more usable form than the oxide because of its greater solubility in the reaction system as compared to the oxide.

Since the reaction is exothermic, it can generally proceed by merely admixing the reactants and permitting the exotherm to raise the temperature of the reaction mass until the exotherm peaks, usually at about 200° to 230° F. After the exotherm peaks, it may be advantageous to apply external heat for about ½ to 2 hours to maintain a maxium reaction temperature between about 220 and about 250 to insure completion of the reaction. Also, in some instances it may be desirable to initiate the reaction by applying external heat just until the exotherm begins.

The reaction is generally carried out at atmospheric pressure. However, higher or lower pressures can be employed if desired. In addition, the reaction is generally completed within about 1 to about 4 hours and more usually from about 2 to about 3 hours.

The preferred aluminum phosphates contain from about 3 to about 40 mole % of boron based upon the moles of aluminum. The more preferred quantity of boron is between about 5 and about 30 mole % while the most preferred quantity is between about 10 and about 25 mole % based upon the moles of aluminum.

Those aluminum phosphates which contain the boron are preferred because of improved tensile strength achieved in the final cured molded articles. The increased tensile strength is even evident at the lower quantity of boron such as at 3 mole %.

In addition, the modification with boron is extremely advantageous since it alters the reactivity of the aluminum phosphate with the alkaline earth material in the presence of aggregate. As the level of boron in the aluminum phosphate increases, the rate of reaction with the alkaline earth material in the presence of aggregate decreases. This is particularly noticeable at boron concentrations of at least about 10 mole % based upon the moles of aluminum. Therefore, the boron modification aspect of the present invention makes it possible to readily manipulate the cure characteristics of the binder system so as to tailor the binder within certain limits, to meet the requirements for a particular application of the binder composition.

The alteration in the cure characteristics and particularly with the free alkaline earth oxide; however, has not been observed in the absence of aggregate such as sand. This may be due to the exothermic nature of the reaction between the aluminum phosphate and free alkaline earth metal oxide whereby the presence of aggregate acts as a heat sink reducing the reactivity to a level where the effect of the boron modification becomes noticeable. On the other hand, the reaction is so fast in the absence of aggregate that any effect which the boron may have on cure is not detectable and, even if detectable, it is of no practical value.

In addition, the boron modification provides aluminum phosphate water solutions which exhibit greatly increased shelf stability as compared to unmodified aluminum phosphate materials. The enhanced shelf stability becomes quite significant when employing quantities of boron of at least about 5 mole % based upon the moles of aluminum.

Moreover, the use of the solid polyhydric alcohol and/or its keto tautomer is most effective when boronated aluminum phosphates are used. In particular, the effectiveness of the polyhydric alcohol or its keto tautomer on improving the stability of physical properties of cured molded articles is increased when using boronated aluminum phosphates, and especially when using the larger quantities of boron such as from about 10 to about 30 mole % based upon the moles of aluminum. Moreover, the effect of the polyhydric alcohols has been quite noticeable when binder-aggregate compositions have been baked such as at about 300°–350° F. for up to about 30 minutes.

The polyhydric alcohols employed according to the present invention are solid at ambient temperature and are soluble in aqueous solutions of the aluminum phosphate. In addition, the polyhydric alcohols contain at least two adjacent carbon atoms each having directly attached thereto a hydroxy group, or are the keto tautomers thereof. The polyhydric alcohols usually contain from about 2 to about 20 hydroxyl groups and preferably from about 2 to about 10 hydroxyl groups in the molecule. In addition, these substances employed according to the present invention generally contain 2 to about 20 carbon atoms and preferably from about 2 to about 10 carbon atoms. In addition, the polyhydric alcohols can contain other groups or atoms which do not adversely affect the function of the material in the compositions of the present invention to an undesirable extent. For instance, many of the polyhydric alcohols employed in the present invention contain ether and/or carboxyl moieties. Also, the polyhydric alcohols are usually non-polymeric. Examples of some polyhydric alcohols include sorbitol, sucrose, invert sugar, D-glucose, B-glucose, dihydroxy succinic acid (tartaric acid), gluconic acid, 1,2,6-hexane triol. The preferred polyhydric alcohols are sorbitol and dihydroxy succinic acid.

The amount of polyhydric alcohol employed in the present invention is usually from about 0.5 to about 25% by weight and preferably from about 2 to about 15% by weight based upon the total weight of the aluminum phosphate and alcohol.

The alkaline earth metal material employed in the present invention is any material containing an alkaline earth metal and containing an oxide which is capable of reacting with the boronated aluminum phosphate. When the alkaline earth metal material is a free alkaline earth metal oxide or a free alkaline earth metal hydroxide, it preferably has a surface area no greater than about 8.5 $m^2$/gram as measured by the BET procedure. More preferably it has a surface area no greater than about 3 $m^2$/gram. Those free oxides and free hydroxides having surface areas no greater than about 8.5 $m^2$/gram are preferred when the binders are employed in molding compositions such as for preparing refractories, abrasive articles and particularly for making shapes such as foundry cores and molds.

It has been observed that compositions of the present invention which employ the preferred oxides and hydroxides have sufficient work times to be adequately mixed in the more conventional types of commercially available batch type mixers before introduction into the mold or pattern for shaping. Although free oxides and free hydroxides having surface areas greater than about 8.5 $m^2$/gram generally are too reactive for use with the more conventional types of commercially available batch type mixers, they are suitable when much faster mixing operations are employed such as those continuous mixing operations which may require only about 20 seconds for adequate mixing or when the binders are to be employed for purposes wherein substantially instantaneous cure is desirable and/or can be tolerated.

Those materials which contain an oxide or hydroxide and an alkaline earth metal, in chemical or physical combination with other constituents are less reactive than the free oxides and hydroxides. Accordingly, such materials can have surface areas greater than about 8.5 $m^2$/gram and be suitable for use even when employing mixing operations which require about 2 to 4 minutes or more.

These other constituents may be present such as being chemically combined with the oxide and alkaline earth metal and/or being physically combined such as by sorption or in the form of an exterior coating. However, the mere mixing of a material with a free oxide or hydroxide without achieving the above type of uniting of the material would not materially reduce the reactivity. Therefore, such mere mixing is not included within the meaning of chemical or physical combinations as used herein.

However, it is preferred that all of the alkaline earth metal materials employed in the present invention have a surface area of no greater than about 8.5 $m^2$/gram and more preferably have a surface area of no greater than about 3 $m^2$/gram. Usually the surface areas are at least about 0.01 $m^2$/gram. All references to surface area unless the contrary is stated, refer to measurement by the BET procedure as set forth in tentative ASTM-D-3037-71T method C-Nitrogen Absorption Surface Area by Continuous Flow Chromatography, Part 28, page 1106, 1972 Edition, employing 0.1 to 0.5 grams of the alkaline earth material.

Included among the suitable materials are calcium oxides, magnesium oxides, calcium silicates, calcium aluminates, calcium aluminum silicates, magnesium silicates, and magnesium aluminates. Also included among the suitable materials of the present invention are the zirconates, borates, and titanates of the alkaline earth metals.

It is preferred to employ either a free alkaline earth metal oxide or a mixture of a free alkaline earth metal oxide and a material which contains the alkaline earth metal and oxide in combination with another constituent such as calcium aluminates. In addition, the preferred alkaline earth metal oxides are the magnesium oxides.

Those materials which include components in combination with the oxide or hydroxide, and the alkaline earth metal, in some instances can be considered as being a latent source of the alkaline earth metal oxide for introducing the alkaline earth metal oxide into the binder system.

Some suitable magnesium oxide materials are available under the trade designations of Magmaster 1-A from Michigan Chemical, Calcined Magnesium Oxide, -325 mesh, Cat. No. M-1016 from Cerac/Pure, Inc.; H-W Periklase Grain 94C Grade (Super Ball Mill Fines); H-W Periklase Grain 94C Grade (Regular Ball Mill Fines); and H-W Periklase Grain 98, (Super Ball Mill Fines) from Harbison-Walker Refractories. Magmaster 1-A has a surface area of about 2.3 $m^2$/gram and Cat. No. M-1016 has a surface area of about 1.4 $m^2$/gram.

A particularly preferred calcium silicate is Wollastonite which is a particularly pure mineral in which the ratio of calcium oxide to silica is substantially equal molar.

Generally commercially available calcium aluminate compositions contain from about 15 to about 40% by weight of calcium oxide and from about 35 to about 80% by weight of alumina, with the sum of the calcium oxide and alumina being at least 70% by weight. Of course, it may be desirable to obtain calcium aluminate compositions which contain greater percentages of the calcium oxide. In fact, calcium aluminates containing up to about 45.5% by weight of calcium oxide have been obtained. Some suitable calcium aluminate materials can be obtained commercially under the trade designations Secar 250 and Fondu from Lone Star Lafarge Company, Lumnite and Refcon from Universal Atlas Cement and Alcoa Calcium Aluminate Cement CA-25 from Aluminum Company of America. Fondu has a minimum surface area as measured by ASTM C115 of about 0.15 $m^2$/gram and 0.265 $m^2$/gram as measured by ASTM C205. Lumnite has a Wagner specific surface of 0.17 $m^2$/gram and Refcon has a Wagner specific surface of 0.19 $m^2$/gram.

Mixtures of a free alkaline earth metal oxide and a material containing components in combination with the free oxide or hydroxide and alkaline earth metal preferably contain from about 1 part by weight to about 10 parts and more preferably from about 2 to about 8 parts by weight of the free alkaline earth metal oxide per part by weight of the material containing substituents in combination with the free metal oxide or hydroxide and alkaline earth metal. Preferably such mixtures are of magnesium oxides and calcium aluminates. The free alkaline earth metal oxide such as magnesium oxides in such mixtures are primarily responsible for achieving fast cure rates while the other component such as the calcium aluminates are mainly responsible for improving the strength characteristics of the final shaped article. Since the free metal oxide is such a more reactive material than those materials which are latent sources of the free metal oxide, those other materials will only have a minimal effect upon the cure rate when in admixture with the alkaline earth metal oxide.

Sometimes it may be desirable to employ the alkaline earth metal material in the form of a slurry or suspension in a diluent primarily to facilitate material handling.

Examples of some suitable liquid diluents include alcohols such as ethylene glycol, furfuryl alcohol, esters such as cellosolve acetate, and hydrocarbons such as kerosene, mineral spirits (odorless), mineral spirits regular, and 140 Solvent available from Ashland Oil, Inc., and Shellflex 131 from Shell Oil, and aromatic hydrocarbons commercially available under the trade designations H-Sol 4-2 and Hi-Sol 10 from Ashland Oil, Inc. Of course, mixtures of different diluents can be employed, if desired. In addition, it may be desirable to add a suspending agent to slurries of the alkaline earth material such as Bentone, Cabosil, and Carbopol in amounts up to about 10% and generally up to less than 5% to assist in stabilizing the slurry or suspension in the diluent.

Generally the alkaline earth metal material and diluent are mixed in a weight ratio of about 1:3 to about 3:1 and preferably from about 1:2 to about 2:1. It has been observed that the non-polar hydrocarbons provide the best strength characteristics as compared to the other diluents which have been tested, when a diluent is employed. In addition, the alcohols such as ethylene glycol and furfuryl alcohol are advantageous as liquid diluents since they increase the work time of the foundry mix without a corresponding percentage increase in the strip time. However, the strength properties of the final foundry shape are somewhat reduced when employing alcohols such as ethylene glycol and furfuryl alcohol.

The other necessary component of the binder system employed in the present invention is water. All or a portion of the water can be supplied to the system as the carrier for the boronated aluminum phosphate material. Also, this water can be introduced as a separate ingredient. Of course, the desired quantity of water can be incorporated in part as the water in the boronated aluminum phosphate and in part from another source. The amount of water employed is from about 15 to about 50% by weight and preferably from about 20 to about 40% by weight based upon the total weight of the boronated aluminum phosphate and water.

The binder composition of the present invention makes possible the obtaining of molded articles including abrasive articles such as grinding wheels, shapes for molding and refractories such as ceramics having improved resistance to deterioration of physical properties such as tensile strength and hardness due to storage. The loss in such physical properties after storage for several hours (i.e., 24 hours or more) is less when employing the binder composition of this invention as compared to employing binder composition which differ only in not including a solid polyhydric alcohol of the type employed in the present invention. The improvement in the stability of physical properties of the cured articles such as molds and cores is most pronounced when the aluminum phosphate is a boronated aluminum phosphate. The effect of the solid polyhydric alcohol is much greater when a boronated aluminum phosphate is used instead of a non-boronated aluminum phosphate.

In addition, it has been observed that the presence of the solid polyhydric alcohol in the binder composition of the present invention improves the flowability of mixtures of the binder composition and aggregate for molding operations.

It has further been observed that the surface finishes of articles cast in molds or cores prepared from compositions of the present invention are improved as compared to compositions which do not contain the solid polyhydric alcohol constituent. It has further been observed that the solid polyhydric alcohols in the amounts employed increase both the work and strip times of molding compositions.

Also, other materials which do not adversely affect the interrelationship between the boronated aluminum phosphate, solid polyhydric alcohol, alkaline earth metal component, and water can be employed, when desired.

When the binder composition of the present invention is used in molding compositions such as for preparing abrasive articles including grinding wheels, refractories including ceramics and structures for molding such as ordinary sand type foundry shapes and precision casting shapes, aggregate is employed along with the binder of the present invention.

When preparing an ordinary sand type foundry shape, the aggregate employed has a particle size large enough to provide sufficient porosity in the foundry shape to permit escape of volatiles from the shape during the casting operation. The term "oridinary sand type foundry shapes" as used herein refers to foundry shapes which have sufficient porosity to permit escape of volatiles from it during the casting operation. Generally, at least about 80% and preferably at least about 90% by weight of aggregate employed for foundry shapes has an average particle size no smaller than about 150 mesh (Tyler Screen Mesh). The aggregate for foundry shapes preferably has an average particle size between about 50 and about 150 mesh (Tyler Screen Mesh). The preferred aggregate employed for ordinary foundry shapes is silica wherein at least about 70 weight % and preferably at least about 85 weight % of the sand is silica. Other suitable aggregate materials include zircon, olivine, alumino-silicate sand, chromite sand, and the like.

When preparing a shape for precision casting, the predominate portion and generally at least about 80% of the aggregate has an average particle size no larger than 150 mesh (Tyler Screen Mesh) and preferably between about 325 mesh and 200 mesh (Tyler Screen Mesh). Preferably at least about 90% by weight of the aggregate for precision casting applications has a particle size no larger than 150 mesh and preferably between 325 mesh and 200 mesh. The preferred aggregates employed for precision casting applications are fused quartz, zircon sands, magnesium silicate sands such as olivine, and aluminosilicate sands.

Shapes for precision casting differ from ordinary sand type foundry shapes in that the aggregate in shapes for precision casting can be more densely packed than the aggregate in shapes for ordinary sand type foundry shapes. Therefore, shapes for precision casting must be heated before being utilized to drive off volatilizable material, present in the molding composition. If the volatiles are not removed from a precision casting shape before use, vapor created during casting will diffuse into the molten metal since the shape has a relatively low porosity. The vapor diffusion would decrease the smoothness of the surface of the precision cast article.

When preparing a refractory such as a ceramic, the predominant portion and at least about 80 weight % of the aggregate employed has an average particle size under 200 mesh and preferably no larger than 325 mesh. Preferably at least about 90% by weight of the aggregate for a refractory has an average particle size under 200 mesh and preferably no larger than 325 mesh. The aggregate employed in the preparation of refractories must be capable of withstanding the curing temperatures such as above about 1500° F. which are needed to cause sintering for utilization. Examples of some suitable aggregates employed for preparing refractories include the ceramics such as refractory oxides, carbides, nitrides, and silicides such as aluminum oxide, lead oxide, chromic oxide, zironcium oxide, silica, silicon carbide, titanium nitride, boron nitride, molybdenum disilicide, and carbonaceous material such as graphite. Mixtures of the aggregates can also be used, when desired, including mixtures of metals and the ceramics.

Examples of some abrasive grains for preparing abrasive articles include aluminum oxide, silicon carbide, boron carbide, corundum, garnet, emery, and mixtures thereof. The grit size is of the usual grades as graded by the United States Bureau of Standards. These abrasive materials and their uses for particular jobs are understood by persons skilled in the art and are not altered in the abrasive articles contemplated by the present invention. In addition, inorganic fillers can be employed along with the abrasive grit in preparing abrasive articles. It is preferred that at least about 85% of the inorganic fillers have average particle size no greater than 200 mesh. It is most preferred that at least about 95% of the inorganic filler has an average particle size no greater than 200 mesh. Some inorganic fillers include cryolite, fluorospar, silica and the like. When an inorganic filler is employed along with the abrasive grit, it is generally present in an amount from about 1 to about 30% by weight based upon the combined weight of the abrasive grit and inorganic filler.

Although the aggregate employed is preferably dry, it can contain small amounts of moisture, such as up to about 0.3% by weight or even higher based on the weight of the aggregate. Such moisture present on the aggregate can be compensated for, by altering the quantity of water added to the compositions along with the other components such as the aluminum phosphate, solid polyhydric alcohol and alkaline earth metal material.

In molding composition, the aggregate constitutes the major constituent and the binder constitutes a relatively minor amount. In ordinary and type foundry applications, the amount of binder is generally no greater than about 10% by weight and frequently within the range of about 0.5 to about 7% by weight, based upon the weight of the aggregate. Most often, the binder content ranges from about 1 to about 5% by weight based upon the weight of the aggregate in ordinary sand type foundry shapes.

In molds and cores for precision casting applications, the amount of binder is generally no greater than about 40% by weight and frequently within the range of about 5 to about 20% by weight based upon the weight of the aggregate.

In refractories, the amount of binder is generally no greater than about 40% by weight and frequently within the range of about 5% to about 20% by weight based upon the weight of the aggregate.

In abrasive articles, the amount of binder is generally no greater than about 25% by weight and frequently within the range of about 5% to about 15% by weight based upon the weight of the abrasive material or grit.

At the present time, it is contemplated that the binder compositions of the present invention are to be made available as a two-package system comprising the aluminum phosphate, solid polyhydric alcohol, and water components in one package and the alkaline earth metal component in the other package.

When the binder compositions are to be employed along with an aggregate, the contents of the package containing the alkaline earth metal component are usually admixed with the aggregate, and then the contents of the aluminum phosphate containing package are admixed with the aggregate and alkaline earth metal component composition. After a uniform distribution of the binder system on the particles of aggregate has been obtained, the resulting mix is molded into the desired shape. Methods of distributing the binder on the aggregate particles are well known to those skilled in the art. The mix can, optionally, contain other ingredients such as iron oxide, ground flax fibers, wood cereals, clay, pitch, refractory flours, and the like.

The binder systems of the present invention are capable of ambient temperature cure which is used herein to include curing by chemical reaction without the need of external heating means. However, within the general description of ambient temperature cure, there are a number of different ambient temperature curing mechanisms which can be employed. For example, ambient temperature cure encompasses both "air cure" and "no bake". Normally, ambient temperature cure is effected at temperatures of from about 50° F. to about 120° F.

Moreover, the molding shapes of the present invention have good scratch resistance and sag resistance immediately at strip. Accordingly, the molding shapes of the present invention can be easily and readily handled and employed immediately after strip.

In addition, the binder systems of the present invention make possible the achievement of molding shapes which possess improved collapsibility and shake out of the shape when used for the casting of the relatively high melting point ferrous-type metals such as iron and steel which are poured at about 2500° F., as compared to other inorganic binder systems such as the silicates.

Furthermore, the binder systems of the present invention make possible the preparation of molding shapes which can be employed for the casting of the relatively low melting point non-ferrous type metals such as aluminum, copper, and copper alloys including brass. The temperatures at which such metals are poured in certain instances may not be high enough to adequately degrade the bonding characteristics of the binder systems of the present invention to the extent necessary to provide the degree of collapsibility and shake out by simple mechanical forces which are usually desired in commercial type of applications.

However, the binder systems of the present invention make it possible to provide molding shapes which can be collapsed and shaken out from castings of the relatively low melting point non-ferrous type metals and particularly aluminum, by water leaching. The shapes can be exposed to water such as by soaking or by a water spray. Moreover, it has been observed that the surface appearance of aluminum cast articles when employing shapes according to the present invention is quite good.

The binder systems of the present invention further make possible the achievement of molding shapes which can be successfully used for casting molten refractory particles in fused casting processes.

It has been also observed that with the binder systems of the present invention, it is possible to readily reclaim and reuse the aggregate employed in such applications as foundry cores and molds after destruction of the shape. In fact, sand aggregate has been successfully reclaimed and reused for at least seven cycles in foundry cores and molds.

When the compositions of the present invention are used to prepare ordinary sand type foundry shapes, the following steps are employed:
(1) forming a foundry mix containing an aggregate (e.g., sand) and the contents of the binder system;
(2) introducing the foundry mix into a mold or pattern to thereby obtain a green foundry shape;
(3) allowing the green foundry shape to remain in the mold or pattern for a time at least sufficient for the shape to obtain a minimum stripping strength (i.e., become self-supporting); and
(4) thereafter removing the shape from the mold or pattern and allowing it to cure at room temperature, thereby obtaining a hard, solid, cured foundry shape.

In order to further understand the present invention the following non-limiting examples concerned with foundry shapes are provided. All parts are by weight unless the contrary is stated. In all the examples, the samples are cured by no-bake procedure at room temperature unless the contrary is stated. The core hardness in the examples was measured on a No. 674 Core Hardness Tester commercially available from Harry W. Dietert Co., Detroit, Mich.

EXAMPLE 1

To a round bottom, 3 liter, 3-necked reaction flask fitted with a heating mantle, mechanical stirrer, reflux condenser and thermometer are added 1650 parts of 85% phosphoric acid. Under mild agitation, 50 parts of granular boric acid are charged to yield a boric acid-phosphoric acid dispersion. The boric acid is added as a smooth steady "stream", as opposed to dumping in bulk, to avoid clumping. To the agitated dispersion are added 310 parts of hydrated alumina (Alcoa, C-33 grade) as a smooth steady stream to give a milky-white slurry.

The reaction mass is heated to a temperature of about 110°-120° F. in about ½ hour at which time external heat is removed. The reaction is continued for about another 20 to 30 minutes with the temperature rising to a maximum of about 220°-230° F. due to the reaction exotherm. Then external heat is applied and reaction temperature rises to a maximum of about 245°-250° F. at which point refluxing occurs. The reaction mass is held at about 245°-250° F. for about 1.5-2 hours to ensure complete reaction. The reaction mass is cooled to about 200° F. in about 45 minutes at which time about 260 parts of water are slowly added with agitation. The temperature of the reaction mass then drops to about 150°-160° F. About 2270 parts of product are then collected in glass-line polypropylene containers. The product is a boronated aluminum phosphate product having a solids content of 66.6%, a viscosity of 700-750 centipoises, mole ratio of phosphorus to total moles of aluminum and boron of 3:1, and about 20 mole % boron based upon the moles of aluminum; a pH of 1.5-2.0 and Gardner color of 2.

5000 parts of Port Crescent sand and about 35 parts of a mixture of magnesium oxide having a surface area of about 2.3 m$^2$/gram (Magmaster 1-A) and Calcium Aluminate (Refcon) in a ratio of 5 parts of magnesium oxide to 1 part of calcium aluminate are admixed for about 2 minutes. To this mixture are added a mixture of about 157.5 parts of the boronated aluminum phosphate product prepared above and about 7.5 parts of sorbitol. The mixture is then agitated for 2 minutes.

The resulting foundry mix is formed by hand ramming into standard AFS tensile strength samples using the standard procedure. The tensile strength of the test bars and core hardness are set forth in Table I below. The composition has a work time of 12 minutes and a strip time of 43 minutes.

EXAMPLE 2

Example 1 is repeated except that about 13.5 parts of sorbitol and about 152.5 parts of the boronated aluminum phosphate are employed. The resulting foundry mix is formed into standard AFS tensile strength samples using the standard procedure. The tensile strength of the test bars and core hardness are set forth in Table I below. The composition has a work time of 11 minutes and a strip time of 36 minutes.

EXAMPLE 3

Example 1 is repeated except 165 parts of the boronated aluminum phosphate without any sorbitol are employed. The resulting foundry mix is formed into standard AFS tensile strength samples using the standard procedure. The tensile strength of the test bars and core hardness are set forth in Table I below. The composition has a work time of 16 minutes and a strip time of 48 minutes.

TABLE I

|  | Example 1 | | Example 2 | | Example 3 | |
| --- | --- | --- | --- | --- | --- | --- |
| % of sorbitol based upon sorbitol and aluminum phosphate solution | 4.5 | | 8.2 | | 0 | |
| Work time (minutes) | 12 | | 11 | | 16 | |
| Strip time (minutes) | 43 | | 36 | | 48 | |
| Time (hours) | Tensile strength psi | Core hardness | Tensile strength psi | Core hardness | Tensile strength psi | Core hardness |
| 2 | 100 | 90 | 150 | 88 | 115 | 86 |
| 4 | 150 | 88 | 185 | 86 | 175 | 84 |
| 6 | 185 | 88 | 210 | 94 | 205 | 85 |
| 24 | 215 | 85 | 230 | 86 | 160 | 81 |
| 48 | 220 | 78 | 245 | 88 | 135 | 74 |
| 72 | 190 | 75 | 255 | 81 | 105 | 68 |

EXAMPLE 4

Example 1 is repeated except that a non-boronated aluminum phosphate having a solids content of 66.6% and a mole ratio of phosphorous to moles of aluminum of 3:1 is employed. The resulting foundry mix is formed into standard AFS tensile strength samples using the standard procedure. The tensile strength of the test bars and core hardness are set forth below in Table II. The composition has a work time of 15 minutes and a strip time of 42 minutes.

EXAMPLE 5

Example 4 is repeated except that about 13.5 parts of sorbitol and 152.5 parts of the aluminum phosphate are employed. The resulting foundry mix is formed into standard AFS tensile strength samples using the standard procedure. The tensile strengths of the test bars and core hardness are set forth below in Table II. The composition has a work time of 8 minutes and a strip time of 32 minutes.

EXAMPLE 6

Example 4 is repeated except that 165 parts of the aluminum phosphate without any sorbitol are employed. The resulting foundry mix is formed into standard AFS tensile strength samples using the standard procedure. The tensile strength of the test bars and core hardness are set forth below in Table II. The composition has a work time of 11 minutes and a strip time of 33 minutes.

EXAMPLE 7

5000 parts of Port Crescent Lake sand and about 25 parts of a mixture of magnesium oxide having a surface area of about 2.3 m$^2$/gram (Magmaster 1-A) and calcium aluminate (Refcon) in a ratio of 5 parts of magnesium oxide to 1 part of calcium aluminate are admixed for about 2 minutes. To this mixture are added a mixture of about 156.65 parts of an aluminum phosphate prepared along the lines of the procedure in Example 1 and having a solids content of 66.6%, viscosity of 700–750 centipoises, mole ratio of phosphorous to total moles of aluminum and boron of 3:1, about 20 mole % boron based upon the moles of aluminum, pH of 1.5–2.0 and Gardner color of 2, and about 8.35 parts of 1,2,6-hexanetriol. The mixture is then agitated for 2 minutes.

The resulting foundry mix is formed into standard AFS tensile strength samples using the standard procedure. The tensile strength of the test bars and core hardness are set forth below in Table III. The composition has a work time of about 30 minutes and a strip time of about 82 minutes.

EXAMPLE 8

Example 7 is repeated except that about 13.5 parts of 1,2,6-hexanetriol and about 151.5 parts of the boronated aluminum phosphate are employed. The resulting foundry mix is formed into standard AFS tensile strength samples using the standard procedure. The tensile strength of the test bars and core hardness are set forth below in Table III. The composition has a work time of about 33 minutes and a strip time of about 75 minutes.

EXAMPLE 9

Example 7 is repeated except that 165 parts of the boronated aluminum phosphate without any of the 1,2,6-hexanetriol are employed. The resulting foundry mix is formed into standard AFS tensile strength samples using the standard procedure. The tensile strength of the test bars and core hardness are set forth below in Table III. The composition has a work time of about 14 minutes and a strip time of about 40 minutes.

TABLE II

|  | Example 4 | | Example 5 | | Example 6 | |
|---|---|---|---|---|---|---|
| % of sorbitol based upon sorbitol and aluminum phosphate solution | 4.5 | | 8.2 | | 0 | |
| Work time (minutes) | 15 | | 8 | | 11 | |
| Strip time (minutes) | 42 | | 32 | | 33 | |
| Time (hours) | Tensile strength psi | Core hardness | Tensile strength psi | Core hardness | Tensile strength psi | Core hardness |
| 2 | 105 | 85 | 115 | 82 | 105 | 74 |
| 4 | 135 | 75 | 160 | 84 | 145 | 80 |
| 6 | 170 | 75 | 160 | 86 | 150 | 70 |
| 24 | 155 | 75 | 125 | 81 | 100 | 69 |
| 48 | 145 | 71 | 145 | 78 | 90 | 78 |
| 72 | 115 | 63 | 115 | 81 | 85 | 73 |

TABLE III

|  | Example 7 | Example 8 | Example 9 |
|---|---|---|---|
| % 1,2,6-hexanetriol based upon total of 1,2,6-hexanetriol and aluminum phosphate solution | 5.06 | 8.20 | 0 |
| Work time (minutes) | 30 | 33 | 14 |
| Strip time (minutes) | 82 | 75 | 40 |
| | Tensile | Tensile | Tensile |

TABLE III-continued

| Time (hours) | strength psi | Core hardness | strength psi | Core hardness | strength psi | Core hardness |
|---|---|---|---|---|---|---|
| 2 | 65 | 90 | 60 | 75 | 130 | 95 |
| 4 |  |  |  |  | 190 | 90 |
| 6 |  |  |  |  | 215 | 85 |
| 24 | 125 | 82 | 115 | 85 | 85 | 72 |
| 48 | 150 | 86 | 125 | 80 | 110 | 67 |
| 72 | 155 | 93 | 135 | 92 | 90 | 74 |

EXAMPLE 10

5000 parts of Port Crescent Lake sand and about 25 parts of a mixture of magnesium oxide having a surface area of about 2.3 $m^2$/gram (Magmaster 1-A) and calcium aluminate (Refcon) in a ratio of 5 parts of magnesium oxide to 1 part of calcium aluminate are admixed for about 2 minutes. To this mixture are added a mixture of about 158 parts of an aluminum phosphate prepared along the lines of the procedure in Example 1 and having a solids content of 66.6%, viscosity of 700–750 centipoises, mole ratio of phosphorus to total moles of aluminum and boron of 3:1, about 20 mole % boron based upon the moles of aluminum, pH of 1.5–2.0 and Gardner color of 2, and about 7 parts of gluconic acid. The mixture is then agitated for 2 minutes.

The resulting foundry mix is formed into standard AFS tensile strength samples using the standard procedure. The tensile strength of the test bars and core hardness are set forth below in Table IV. The composition has a work time of about 19 minutes and a strip time of about 62 minutes.

EXAMPLE 11

Example 10 is repeated except that about 10.3 parts of gluconic acid and about 154.7 parts of the boronated aluminum phosphate are employed. The resulting foundry mix is formed into standard AFS tensile strength samples using the standard procedure. The tensile strength of the test bars and core hardness are set forth below in Table IV. The composition has a work time of about 23 minutes and a strip time of about 58 minutes.

EXAMPLE 12

Example 10 is repeated except that about 16.5 parts of gluconic acid and about 148.5 parts of the boronated aluminum phosphate are employed. The resulting foundry mix is formed into standard AFS tensile strength samples using the standard procedure. The tensile strength of the test bars and core hardness are set forth below in Table IV. The composition has a work time of about 18 minutes and a strip time of about 55 minutes.

EXAMPLE 13

Example 10 is repeated except that 165 parts of the boronated aluminum phosphate without any gluconic acid are employed. The resulting foundry mix is formed into standard AFS tensile strength samples using the standard procedure. The tensile strength of the test bars and core hardness are set forth in Table IV below. The composition has a work time of about 14 minutes and a strip time of about 40 minutes.

TABLE IV

|  | Example 10 | Example 11 | Example 12 | Example 13 |
|---|---|---|---|---|
| % gluconic acid based upon total of gluconic acid and aluminum phosphate solution | 4.25 | 6.25 | 10 | 0 |
| Work time (minutes) | 19 | 23 | 18 | 14 |
| Strip time (minutes) | 62 | 58 | 55 | 40 |

| Time (hours) | Tensile strength psi | Core hardness | Tensile strength psi | Core hardness | Tensile strength psi | Core hardness | Tensile strength psi | Core hardness |
|---|---|---|---|---|---|---|---|---|
| 2 | 95 | 88 | 100 | 90 | 105 | 91 | 130 | 95 |
| 4 | 160 | 90 |  |  | 160 | 91 | 190 | 90 |
| 6 | 220 | 91 |  |  | 205 | 91 | 215 | 85 |
| 24 | 200 | 90 | 240 | 89 | 220 | 92 | 85 | 72 |
| 48 | 245 | 88 | 215 | 88 | 250 | 90 | 110 | 67 |
| 72 | 150 | 92 | 235 | 91 | 225 | 86 | 90 | 74 |

EXAMPLE 14

5000 parts of Port Crescent Lake sand and about 25 parts of a mixture of magnesium oxide having a surface area of about 2.3 $m^2$/gm (Magmaster 1-A) and calcium aluminate (Refcon) in a ratio of 5 parts of magnesium oxide to 1 part of calcium aluminate are admixed for about 2 minutes. To this mixture are added a mixture of about 156.65 parts of an aluminum phosphate prepared along the lines of the procedure in Example 1 and having a solids content of 66.6%, viscosity of 700–750 centipoises, mole ratio of phosphorus to total moles of aluminum and boron of 3:1, about 20 mole % boron based upon the moles of aluminum, pH of 1.5–2.0 and Gardner color of 2, and about 8.35 parts of d-tartaric acid. The mixture is then agitated for 2 minutes.

The resulting foundry mix is formed into standard AFS tensile strength samples using the standard procedure. The tensile strength of the test bars and core hardness are set forth below in Table V. The composition has a work time of about 16 minutes and a strip time of about 52 minutes.

EXAMPLE 15

Example 14 is repeated except that about 13.5 parts of d-tartaric acid and about 151.5 parts of the boronated aluminum phosphate are employed. The resulting foundry mix is formed into standard AFS tensile strength samples using the standard procedure. The tensile strength of the test bars and core hardness are set forth below in Table V. The composition has a work time of about 15 minutes and a strip time of about 51 minutes.

EXAMPLE 16

Example 14 is repeated except that about 2 parts of d-tartaric acid and about 163 parts of the boronated aluminum phosphate are employed. The resulting foundry mix is formed into standard AFS tensile strength samples using the standard procedure. The tensile strength of the test bars and core hardness are set forth below in Table V. The composition has a work time of about 16 minutes and a strip time of about 58 minutes.

EXAMPLE 17

Example 14 is repeated except that about 4 parts of d-tartaric acid and about 161 parts of the boronated aluminum phosphate are employed. The resulting foundry mix is formed into standard AFS tensile strength samples using the standard procedure. The tensile strength of the test bars and core hardness are set forth below in Table V. The composition has a work time of about 15 minutes and a strip time of about 42 minutes.

EXAMPLE 18

Example 14 is repeated except that 165 parts of the boronated aluminum phosphate without any d-tartaric acid are employed. The resulting foundry mix is formed into standard AFS tensile strength samples using the standard procedure. The tensile strength of the test bars and core hardness are set forth below in Table V. The composition has a work time of about 14 minutes and a strip time of about 40 minutes.

EXAMPLE 19

5000 parts of Port Crescent Lake sand and about 25 parts of a mixture of magnesium oxide having a surface area of about 2.3 $m^2/gm$ (Magmaster 1-A) and calcium aluminate (Refcon) in a ratio of 5 parts of magnesium oxide to 1 part of calcium aluminate are admixed for about 2 minutes. To this mixture are added a mixture of about 160 parts of an aluminum phosphate prepared along the lines of the procedure in Example 1 and having a solids content of 66.6%, viscosity of 700–750 centipoises, mole ratio of phosphorus to total moles of aluminum and boron of 3:1, about 20 mole % boron based upon the moles of aluminum, pH of 1.5–2.0 and Gardner color of 2, and about 5 parts of invert sugar. The mixture is then agitated for 2 minutes.

The resulting foundry mix is formed into standard AFS tensile strength samples using the standard procedure. The tensile strength of the test bars and core hardness are set forth below in Table VI. The composition has a work time of about 12 minutes and a strip time of about 42 minutes.

EXAMPLE 20

Example 19 is repeated except that about 10 parts of invert sugar and about 155 parts of the boronated aluminum phosphate are employed. The resulting foundry mix is formed into standard AFS tensile strength samples using the standard procedure. The tensile strength of the test bars and core hardness are set forth below in Table VI. The composition has a work time of about 10 minutes and a strip time of about 41 minutes.

EXAMPLE 21

Example 19 is repeated except that about 14 parts of invert sugar and about 151 parts of the boronated aluminum phosphate are employed. The resulting foundry mix is formed into standard AFS tensile strength samples using the standard procedure. The tensile strength of the test bars and core hardness are set forth below in Table VI. The composition has a work time of about 10 minutes and a strip time of about 44 minutes.

TABLE V

|  | Example 14 | | Example 15 | | Example 16 | | Example 17 | | Example 18 | |
| --- | --- | --- | --- | --- | --- | --- | --- | --- | --- | --- |
| % d-tartaric acid based upon total of d-tartaric acid and aluminum phosphate solution | 5.06 | | 8.2 | | 1.2 | | 2.43 | | 0 | |
| Work time (minutes) | 16 | | 15 | | 16 | | 15 | | 14 | |
| Strip time (minutes) | 52 | | 51 | | 58 | | 42 | | 40 | |
| Time (hours) | Tensile strength psi | Core hardness | Tensile strength psi | Core hardness | Tensile strength psi | Core hardness | Tensile strength psi | Core hardness | Tensile strength psi | Core hardness |
| 2 | 130 | 94 | 145 | 89 | 150 | 91 | 105 | 90 | 130 | 95 |
| 4 | 165 | 92 | | | 200 | 85 | 180 | 88 | 190 | 90 |
| 6 | 195 | 91 | | | 200 | 85 | 205 | 84 | 215 | 85 |
| 24 | 270 | 91 | 260 | 86 | 260 | 86 | | | 85 | 72 |
| 48 | 220 | 88 | 225 | 85 | | | | | 110 | 67 |
| 72 | 195 | 86 | 215 | 88 | 185 | 85 | 240 | 86 | 90 | 74 |
| 96 | | | | | 195 | 88 | 215 | 85 | | |
| 120 | | | | | | | 210 | 88 | | |

EXAMPLE 22

Example 19 is repeated except that about 18 parts of invert sugar and about 147 parts of the boronated aluminum phosphate are employed. The resulting foundry mix is formed into standard AFS tensile strength samples using the standard procedure. The tensile strength of the test bars and core hardness are set forth below in Table VI. The composition has a work time of about 11 minutes and a strip time of about 45 minutes.

EXAMPLE 23

Example 19 is repeated except that about 20.8 parts of invert sugar and about 144.2 parts of the boronated aluminum phosphate are employed. The resulting foundry mix is formed into standard AFS tensile strength samples using the standard procedure. The tensile strength of the test bars and core hardness are set forth below in Table VI. The composition has a work time of about 10 minutes and a strip time of about 47 minutes.

EXAMPLE 24

Example 19 is repeated except that about 25.6 parts of invert sugar and about 139.6 parts of the boronated aluminum phosphate are employed. The resulting foundry mix is formed into standard AFS tensile strength samples using the standard procedure. The tensile strength of the test bars and core hardness are set forth below in Table VI. The composition has a work time of about 12 minutes and a strip time of about 45 minutes.

EXAMPLE 25

Example 19 is repeated except that 165 parts of the aluminum phosphate without any invert sugar are employed. The resulting foundry mix is formed into standard AFS tensile strength samples using the standard procedure. The tensile strength of the test bars and core hardness are set forth below in Table VI. The composition has a work time of about 14 minutes and a strip time of about 40 minutes.

EXAMPLE 26

5000 parts of Port Crescent Lake sand and about 25 parts of a mixture of magnesium oxide having a surface area of about 2.3 m$^2$/gm (Magmaster 1-A) and calcium aluminate (Refcon) in a ratio of 5 parts of magnesium oxide to 1 part of calcium aluminate are admixed for about 2 minutes. To this mixture are added a mixture of about 160 parts of an aluminum phosphate prepared along the lines of the procedure in Example 1 and having a solids content of 66.6%, viscosity of 700–750 centipoises, mole ratio of phosphorus to total moles of aluminum and boron of 3:1, about 20 mole % boron based upon the moles of aluminum, pH of 1.5–2.0 and Gardner color of 2, and about 5 parts of sucrose. The mixture is then agitated for 2 minutes.

The resulting foundry mix is formed into standard AFS tensile strength samples using the standard procedure. The tensile strength of the test bars and core hardness are set forth below in Table VII. The composition has a work time of about 13 minutes and a strip time of 45 minutes.

EXAMPLE 27

Example 26 is repeated except that about 10 parts of sucrose and about 155 parts of the boronated aluminum phosphate are employed. The resulting foundry mix is formed into standard AFS tensile strength samples using the standard procedure. The tensile strength of the test bars and core hardness are set forth below in Table VII. The composition has a work time of about 11 minutes and a strip time of about 55 minutes.

EXAMPLE 28

Example 26 is repeated except that about 14 parts of sucrose and about 151 parts of the boronated aluminum phosphate are employed. The resulting foundry mix is formed into standard AFS tensile strength samples using the standard procedure. The tensile strength of the test bars and core hardness as set forth below in Table VII. The composition has a work time of about 12 minutes and a strip time of about 50 minutes.

EXAMPLE 29

Example 26 is repeated except that about 18 parts of sucrose and about 147 parts of the boronated aluminum phosphate are employed. The resulting foundry mix is formed into standard AFS tensile strength samples

TABLE VI

| | Example 19 | Example 20 | Example 21 | Example 22 | Example 23 | Example 24 | Example 25 |
|---|---|---|---|---|---|---|---|
| % of invert sugar based upon total invert sugar and boronated aluminum phosphate solution | 3.0 | 6.0 | 8.5 | 11.0 | 13.0 | 15.5 | 0 |
| Work time (minutes) | 12 | 10 | 10 | 11 | 10 | 12 | 14 |
| Strip time (minutes) | 42 | 41 | 44 | 45 | 47 | 45 | 40 |

| Time (hours) | Tensile strength psi | Core hardness | Tensile strength psi | Core hardness | Tensile strength psi | Core hardness | Tensile strength psi | Core hardness | Tensile strength psi | Core hardness | Tensile strength psi | Core hardness | Tensile strength psi | Core hardness |
|---|---|---|---|---|---|---|---|---|---|---|---|---|---|---|
| 2 | 140 | 95 | 120 | 95 | 115 | 97 | 115 | 95 | 95 | 95 | 95 | 85 | 130 | 95 |
| 4 | 185 | 95 | 155 | 92 | 200 | 95 | 155 | 95 | 170 | 90 | 180 | 86 | 190 | 90 |
| 6 | 195 | 98 | 210 | 95 | 185 | 90 | | | | | | | 215 | 85 |
| 24 | 185 | 90 | 195 | 85 | 200 | 95 | 195 | 90 | 195 | 85 | 160 | 80 | 85 | 72 |
| 48 | 140 | 85 | 170 | 92 | 230 | 88 | 200 | 80 | 225 | 80 | 170 | 80 | 110 | 67 |
| 72 | 130 | 80 | 175 | 90 | 190 | 84 | 225 | 90 | 220 | 90 | 165 | 84 | 90 | 74 |
| 96 | | | | | | | 225 | 90 | 190 | 78 | 185 | 85 | | | phosphate are employed. The resulting foundry mix is formed into standard AFS tensile strength samples using the standard procedure. The tensile strength of the test bars and core hardness are set forth below in Table VII. The composition has a work time of about 11 minutes and a strip time of about 45 minutes.

EXAMPLE 30

Example 26 is repeated except that about 20.8 parts of sucrose and about 144.2 parts of the boronated aluminum phosphate are employed. The resulting foundry mix is formed into standard AFS tensile strength samples using the standard procedure. The tensile strength of the test bars and core hardness are set forth below in Table VII. The composition has a work time of about 9 minutes and a strip time of about 45 minutes.

EXAMPLE 31

Example 26 is repeated except that about 25.6 parts of sucrose and about 139.6 parts of the boronated aluminum phosphate are employed. The resulting foundry mix is formed into standard AFS tensile strength samples using the standard procedure. The tensile strength of the test bars and core hardness are set forth below in Table VII. The composition has a work time of about 11 minutes and a strip time of about 46 minutes.

EXAMPLE 32

Example 26 is repeated except that 165 parts of the boronated aluminum phosphate without any sucrose are employed. The resulting foundry mix is formed into standard AFS tensile strength samples using the standard procedure. The tensile strength of the test bars and core hardness are set forth below in Table VII. The composition has a work time of about 14 minutes and a strip time of about 40 minutes.

aluminum and boron of 3:1, about 20 mole % boron based upon the moles of aluminum, pH of 1.5–2.0 and Gardner color of 2, and about 1.8 parts of sorbitol. The mixture is then agitated for 2 minutes.

The resulting foundry mix is formed with standard AFS tensile strength samples using the standard procedure. The tensile strength of the test bars is set forth below in Table VIII.

EXAMPLE 34

Example 33 is repeated except that about 5.3 parts of sorbitol and about 159.7 parts of the boronated aluminum phosphate are employed. The resulting foundry mix is formed into standard AFS tensile strength samples using the standard procedure. The tensile strength of the test bars is set forth below in Table VIII.

EXAMPLE 35

Example 33 is repeated except that about 10.2 parts of sorbitol and about 154.8 parts of the boronated aluminum phosphate are employed. The resulting foundry mix is formed into standard AFS tensile strength samples using the standard procedure. The tensile strength of the test bars is set forth below in Table VIII.

EXAMPLE 36

Example 33 is repeated except that about 13.5 parts of sorbitol and about 151.5 parts of the boronated aluminum phosphate are employed. The resulting foundry mix is formed into standard AFS tensile strength samples using the standard procedure. The tensile strength of the test bars is set forth below in Table VIII.

EXAMPLE 37

TABLE VII

| | Example 26 | | Example 27 | | Example 28 | | Example 29 | | Example 30 | | Example 31 | | Example 32 | |
| --- | --- | --- | --- | --- | --- | --- | --- | --- | --- | --- | --- | --- | --- | --- |
| % of sucrose based upon total of sucrose and boronated aluminum phosphate solution | 3.0 | | 6.0 | | 8.5 | | 11.0 | | 13.0 | | 15.5 | | 0 | |
| Work time (minutes) | 13 | | 11 | | 12 | | 11 | | 9 | | 11 | | 14 | |
| Strip time (minutes) | 45 | | 55 | | 50 | | 45 | | 45 | | 46 | | 40 | |
| Time (hours) | Tensile strength psi | Core hardness | Tensile strength psi | Core hardness | Tensile strength psi | Core hardness | Tensile strength psi | Core hardness | Tensile strength psi | Core hardness | Tensile strength psi | Core hardness | Tensile strength psi | Core hardness |
| 2 | 135 | 93 | 115 | 95 | 115 | 93 | 145 | 88 | 170 | 95 | 125 | 95 | 130 | 95 |
| 4 | 205 | 88 | 155 | 85 | 170 | 88 | | | | | 190 | 90 | 190 | 90 |
| 6 | 215 | 98 | 205 | 84 | | | | | | | 190 | 90 | 215 | 85 |
| 24 | 200 | 82 | 165 | 78 | 190 | 88 | 150 | 75 | 190 | 82 | 195 | 85 | 85 | 72 |
| 48 | 135 | 90 | 135 | 85 | 165 | 88 | 170 | 75 | 185 | 88 | 195 | 83 | 110 | 67 |
| 72 | 100 | 80 | 120 | 72 | 155 | 78 | 180 | 75 | 180 | 85 | | | 90 | 74 |

EXAMPLE 33

5000 parts of Wedron 5010 sand and about 30 parts of a mixture of magnesium oxide having a surface area of about 2.3 m²/gm (Magmaster 1-A) and calcium aluminate (Refcon) in a ratio of 5 parts of magnesium oxide to 1 part of calcium aluminate are admixed for about 2 minutes. To this mixture are added a mixture of about 163.2 parts of an aluminum phosphate prepared along the lines of the procedure in Example 1 and having a solids content of 66.6%, viscosity of 700–750 centipoises, mole ratio of phosphorus to total moles of Example 33 is repeated except that about 16.5 parts of sorbitol and about 148.5 parts of the boronated aluminum phosphate are employed. The resulting foundry mix is formed into standard AFS tensile strength samples using the standard procedure. The tensile strength of the test bars is set forth below in Table VIII.

EXAMPLE 38

Example 33 is repeated except that 165 parts of the boronated aluminum phosphate without any sorbitol are employed. The resulting foundry mix is formed into standard AFS tensile strength samples using the standard procedure. The tensile strength of the test bars is set forth below in Table VIII.

TABLE VIII

|  | Example 33 | | Example 34 | | Example 35 | | Example 36 | | Example 37 | | Example 38 | |
| --- | --- | --- | --- | --- | --- | --- | --- | --- | --- | --- | --- | --- |
| % sorbitol based upon total of sorbitol and boronated aluminum phosphate solution | 1.1 | | 3.2 | | 6.2 | | 8.2 | | 10 | | 0 | |
| Time (hours) | Tensile strength psi | Average of samples | Tensile strength psi | Average of samples | Tensile strength psi | Average of samples | Tensile strength psi | Average of samples | Tensile strength psi | Average of samples | Tensile strength psi | Average of samples |
| 24 | 295 280 300 | 292 | 120 270 160 | 183 | 200 230 200 | 210 | 150 165 190 | 168 | 145 200 210 | 185 | 225 105 245 | 212 |
| 48 | 245 190 250 | 228 | 225 175 230 | 210 | 195 230 250 | 225 | 195 225 220 | 213 | 235 235 252 | 237 | 200 165 195 | 187 |
| 72 | 215 275 200 | 230 | 145 175 170 | 163 | 270 245 250 | 255 | 150 150 185 | 163 | 250 255 210 | 235 | 185 185 250 | 207 |
| 120 | 250 270 165 | 228 | 245 185 165 | 198 | 260 265 200 | 242 | 260 185 160 | 202 | 220 230 245 | 232 | 155 150 165 | 157 |

The following Examples 39 and 40 demonstrate the improved tensile strength achieved by employing the polyhydric alcohols when the samples are baked rather than cured at room temperature. The baking up to about 30 minutes provided improved tensile strength for the sorbitol containing samples.

EXAMPLE 39

5000 parts of Wedron 5010 sand and about 30 parts of a mixture of magnesium oxide having a surface area of about 2.3 m$^2$/gram (Magmaster 1-A) and calcium aluminate (Refcon) in a ratio of 5 parts of magnesium oxide to 1 part of calcium aluminate are admixed for about 2 minutes. To this mixture are added a mixture of about 151.5 parts of an aluminum phosphate prepared along the lines of the procedure in Example 1 and having a solids content of 66.6%, viscosity of 700–750 centipoises, mole ratio of phosphorus to total moles of aluminum and boron of 3:1, about 20 mole % boron based upon the moles of aluminum, pH of 1.5–2.0 and Gardner color of 2, and about 13.5 parts of sorbitol. The mixture is then agitated for 2 minutes.

The resulting foundry mix is formed into standard AFS tensile strength samples using the standard procedure. The test bars are heated at about 350° F. for the different times set forth below in Table IX. The tensile strengths of the test bars are set forth below in Table IX.

EXAMPLE 40

Example 39 is repeated except that 165 parts of the boronated aluminum phosphate without any sorbitol are employed. The resulting foundry mix is formed into standard AFS tensile strength samples using the standard procedure. The tests are heated at about 350° F. for the different times set forth below in Table IX. The tensile strengths of the test bars are set forth below in Table IX.

TABLE IX

|  | Example 39 | | Example 40 | |
| --- | --- | --- | --- | --- |
| % sorbitol based upon total of sorbitol and boronated aluminum phosphate solution | 8.2 | | 0 | |
|  | Tensile strength 1 hour after strip psi | Average of three samples | Tensile strength 1 hour after strip psi | Average of three samples |
| Baked at 350° F. for 15 minutes | 375 310 355 | 347 | 235 255 240 | 243 |
| Baked at 350° F. for 30 minutes | 255 295 300 | 283 | 110 205 185 | 165 |
| Baked at 350° F. for 45 minutes | 165 170 225 | 187 | 185 200 185 | 190 |

EXAMPLE 41

To a reaction vessel equipped with a stirrer, thermometer, and reflux condenser are added about 2445 parts of 85% phosphoric acid. Then about 67 parts of sodium borate are added with agitation, and the agitation is continued for about 10 minutes until the borate dissolves in the acid to form a clear solution. To this solution are added about 540 parts of hydrated alumina (Alcoa C-33) under agitation. The reaction proceeds for about 40 minutes with the temperature rising to a maximum of about 220° F. due to the reaction exotherm. Then external heat is applied and reaction temperature rises to a maximum of about 245° F. The reaction mass is held at about 245° F. for about 2 hours to ensure complete reaction. The reaction mass is then cooled to room temperature and about 3052 parts of a boronated aluminum phosphate having a solids content of about 75%, a viscosity of about 40,000 centipoises, a mole ratio of phosphorus to total moles of aluminum and boron of 3:1 and about 10 mole % boron based upon the moles of aluminum are obtained. This aluminum phosphate is diluted with water to provide a solids content of about 66% and having a viscosity of 400–500 centipoises.

5000 parts of Port Crescent Lake sand and about 30.5 parts of a mixture of magnesium oxide (Magmaster 1-A) and a calcium aluminate containing 58% $Al_2O_3$ and 33% CaO (Refcon) in a ratio of 5 parts of magnesium oxide to 1 part of calcium aluminate are mixed for about 2 minutes. To this mixture are added a mixture of about 151.5 parts of the 66% solids solution of the boronated aluminum phosphate prepared above and about 13.5 parts of sorbitol. The mixture is then agitated for 2 minutes.

The resulting foundry mix is formed by hand ramming into standard AFS tensile strength using the standard procedure. The tensile strengths and core hardness of the test bars are presented below in Table X. The work time of the composition is 13 minutes and the strip time is 45 minutes.

EXAMPLE 42

Example 41 is repeated except that about 8.4 parts of d-tartaric acid and about 156.6 parts of the boronated aluminum phosphate are employed. The resulting foundry mix is formed into standard AFS tensile strength samples using the standard procedure. The tensile strength of the test bars and core hardness are set forth below in Table X. The composition has a work time of about 11 minutes and a strip time of about 32 minutes.

EXAMPLE 43

Example 41 is repeated except that 165 parts of the boronated aluminum phosphate without any polyhydric alcohol are employed. The resulting foundry mix is formed into standard AFS tensile strength samples using the standard procedure. The tensile strength of the test bars and core hardness are set forth below in Table X. The composition has a work time of about 13 minutes and a strip time of about 42 minutes.

TABLE X

| | Example 41 | | Example 42 | | Example 43 | |
| --- | --- | --- | --- | --- | --- | --- |
| | 8.2% sorbitol | | 5.1% tartaric acid | | 0% polyhydric alcohol | |
| Work time (min) | 13 | | 11 | | 13 | |
| Strip time (min) | 45 | | 32 | | 42 | |
| Time (hrs) | Tensile strength psi | Core hardness | Tensile strength psi | Core hardness | Tensile strength psi | Core hardness |
| 2 | 125 | 65 | 115 | 72 | 125 | 75 |
| 4 | 180 | 69 | 145 | | 165 | 72 |
| 6 | 155 | 68 | | | 160 | 74 |
| 24 | 165 | 64 | 110 | 65 | 120 | 65 |
| 48 | 165 | 62 | 110 | 76 | | |

EXAMPLE 44

Example 41 is repeated except that a boronated aluminum phosphate containing 20 mole % boron and 20 mole % sodium based upon the aluminum and prepared according to the procedure of Example 41 is employed. The resulting foundry mix is formed by hand ramming into standard AFS tensile strength samples using the standard procedure. The tensile strength of the test bars and core hardness are set forth below in Table XI. The composition has a work time of about 15 minutes and a strip time of about 38 minutes.

EXAMPLE 45

Example 44 is repeated except that about 8.4 parts of d-tartaric acid and about 156.6 parts of the boronated aluminum phosphate are employed. The resulting foundry mix is formed into standard AFS tensile strength samples using the standard procedure. The tensile strength of the test bars and core hardness are set forth below in Table XI. The composition has a work time of about 12 minutes and a strip time of about 30 minutes.

EXAMPLE 46

Example 44 is repeated except that 165 parts of the boronated aluminum phosphate without any polyhydric alcohol are employed. The resulting foundry mix is formed into standard AFS tensile strength samples using the standard procedure. The tensile strength of the test bars and core hardness are set forth below in Table XI. The composition has a work time of about 15 minutes and a strip time of about 38 minutes.

TABLE XI

| | Example 44 | | Example 45 | | Example 46 | |
| --- | --- | --- | --- | --- | --- | --- |
| | 8.2% sorbitol | | 5.1% tartaric acid | | 0% polyhydric alcohol | |
| Work time (min) | 12 | | 12 | | 15 | |
| Strip time (min) | 39 | | 30 | | 38 | |
| Time (hrs) | Tensile strength psi | Core hardness | Tensile strength psi | Core hardness | Tensile strength psi | Core hardness |
| 2 | 120 | 79 | 105 | 74 | 100 | 58 |
| 4 | 170 | 76 | 150 | 69 | 155 | 77 |
| 6 | 185 | 75 | 170 | 78 | 110 | 50 |
| 24 | 215 | 71 | 185 | 67 | 65 | 32 |
| 48 | 225 | 78 | 155 | 68 | | |

A comparison of Examples 1 and 2 with 3; Examples 4 and 5 with 6; Examples 7 and 8 with 9; Examples 10–12 with 13; Examples 14–17 with 18; Examples 19–24 with 25; Examples 26–31 with 32; Examples 33–37 with 38; Example 39 with 40; Examples 41 and 42 with 43; and Examples 44 and 45 with 46 demonstrates that after storage for several hours, the general trend is improvement in physical properties such as tensile strength and core hardness due to the presence of the type of polyhydric materials employed in the present invention, although a few of the samples do not fit the general behavior due to some normal experimental error. Although the systems of the present invention may not possess as great initial physical properties as those corresponding systems which do not include the polyhydric materials, the higher physical properties after storage for several hours is quite important from a practical and commercial viewpoint.

The following Examples 47–55 demonstrate that the use of polyhydric alcohols outside the scope of the present invention does not result in the type of improved tensile strengths as is obtained by practicing the present invention. For instance, the polyhydrics employed in the following examples are not solid and/or do not contain at least two adjacent carbon atoms each having directly attached thereto one hydroxyl group.

EXAMPLE 47

5000 parts of Port Crescent Lake sand and about 25 parts of a mixture of magnesium oxide having a surface area of about 2.3 m²/gm (Magmaster 1-A) and calcium aluminate (Refcon) in a ratio of 5 parts of magnesium oxide to 1 part of calcium aluminate are admixed for about 2 minutes. To this mixture are added a mixture of about 156.65 parts of an aluminum phosphate prepared along the lines of the procedure in Example 1 and having a solids content of 66.6%, viscosity 700-750 centipoises, mole ratio of phosphorus to total moles of aluminum and boron of 3:1, about 20 mole % boron based upon the moles of aluminum, pH of 1.5-2.0 and Gardner color of 2, and about 8.35 parts of 1,4-butanediol. The mixture is then agitated for 2 minutes.

The resulting foundry mix is formed into standard AFS tensile strength samples using the standard procedure. The tensile strength of the test bars and core are set forth below in Table XII. The composition has a work time of about 26 minutes and a strip time of about 78 minutes.

EXAMPLE 48

Example 47 is repeated except that about 13.5 parts of 1,4-butanediol and about 151.5 parts of the boronated aluminum phosphate are employed. The resulting foundry mix is formed into standard AFS tensile strength samples using the standard procedure. The tensile strength of the test bars and core hardness are set forth below in Table XII. The composition has a work time of about 32 minutes and a strip time of about 90 minutes.

EXAMPLE 49

Example 47 is repeated except that about 8.35 parts of 1,6-hexanediol and about 156.65 parts of the boronated aluminum phosphate are employed. The resulting foundry mix is formed into standard AFS tensile strength samples using the standard procedure. The tensile strength of the test bars and core hardness are set forth below in Table XII. The composition has a work time of about 19 minutes and a strip time of 74 minutes.

EXAMPLE 50

Example 47 is repeated except that about 13.5 parts of 1,6-hexanediol and about 151.5 parts of the boronated aluminum phosphate are employed. The resulting foundry mix is formed into standard AFS tensile strength samples using the standard procedure. The tensile strength of the test bars and core hardness are set forth below in Table XII. The composition has a work time of about 17 minutes and a strip time of about 62 minutes.

EXAMPLE 51

Example 47 is repeated except that about 8.35 parts of trimethylolpropane and about 156.65 parts of the boronated aluminum phosphate are employed. The resulting foundry mix is formed into standard AFS tensile strength samples using the standard procedure. The tensile strength of the test bars and core hardness are set forth below in Table XII. The composition has a work time of about 23 minutes and a strip time of about 110 minutes.

EXAMPLE 52

Example 47 is repeated except that about 13.5 parts of trimethylolpropane and about 151.5 parts of the boronated aluminum phosphate are employed. The resulting foundry mix is formed into standard AFS tensile strength samples using the standard procedure. The tensile strength of the test bars and core hardness are set forth below in Table XII. The composition has a work time of about 36 minutes and a strip time of about 76 minutes.

EXAMPLE 53

Example 47 is repeated except that about 8.35 parts of neopentylglycol and about 156.65 parts of the boronated aluminum phosphate are employed. The resulting foundry mix is formed into standard AFS tensil strength samples using the standard procedure. The tensile strength of the test bars and core hardness are set forth below in Table XII. The composition has a work time of about 27 minutes and a strip time of about 81 minutes.

EXAMPLE 54

Example 47 is repeated except that about 13.5 parts of neopentylglycol and about 151.5 parts of the boronated aluminum phosphate are employed. The resulting foundry mix is formed into standard AFS tensile strength samples using the standard procedure. The tensile strength of the test bars and core hardness are set forth below in Table XII. The composition has a work time of about 24 minutes and a strip time of about 67 minutes.

EXAMPLE 55

Example 47 is repeated except that 165 parts of the boronated aluminum phosphate without any alcohol are employed. The resulting foundry mix is formed into standard AFS tensile strength samples using the standard procedure. The tensile strength of the test bars and core hardness are set forth below in Table XII. The composition has a work time of about 14 minutes and a strip time of about 40 minutes.

TABLE XII

| | Example 47 | | Example 48 | | Example 49 | | Example 50 | | Example 51 | |
|---|---|---|---|---|---|---|---|---|---|---|
| % polyhydric alcohol based upon total of alcohol and aluminum phosphate solution | 5.06 | | 8.2 | | 5.06 | | 8.2 | | 5.06 | |
| Work time (minutes) | 26 | | 32 | | 19 | | 17 | | 23 | |
| Strip time (minutes) | 78 | | 90 | | 74 | | 62 | | 110 | |
| Time (hours) | Tensile strength psi | Core hardness | Tensile strength psi | Core hardness | Tensile strength psi | Core hardness | Tensile strength psi | Core hardness | Tensile strength psi | Core hardness |
| 2 | 65 | 65 | 55 | 45 | | | | | | |

TABLE XII-continued

| Time | | | | | | | | | | |
|---|---|---|---|---|---|---|---|---|---|---|
| 4 | | | | | 80 | 50 | 75 | 50 | 100 | 74 |
| 6 | 95 | 70 | 80 | 52 | 80 | 48 | 60 | 35 | | |
| 24 | 110 | 67 | 60 | 48 | 45 | 0 | 60 | 0 | 95 | 60 |
| 48 | 105 | 72 | 75 | 42 | 35 | 0 | 55 | 0 | 55 | 33 |
| 72 | 100 | 70 | 65 | 40 | | | | | | |

| | Example 52 | Example 53 | Example 54 | Example 55 |
|---|---|---|---|---|
| % polyhydric alcohol based upon total of alcohol and aluminum phosphate solution | 8.2 | 5.06 | 8.2 | 0 |
| Work time (minutes) | 36 | 27 | 24 | 14 |
| Strip time (minutes) | 76 | 81 | 67 | 40 |

| Time (hours) | Tensile strength psi | Core hardness | Tensile strength psi | Core hardness | Tensile strength psi | Core hardness | Tensile strength psi | Core hardness |
|---|---|---|---|---|---|---|---|---|
| 2 | 55 | 80 | 75 | 45 | 65 | 39 | 130 | 95 |
| 4 | | | | | | | 190 | 90 |
| 6 | | | | | 85 | 20 | 215 | 85 |
| 24 | 110 | 82 | 50 | 10 | 85 | 20 | 85 | 72 |
| 48 | 50 | 12 | 50 | 10 | | | 110 | 67 |
| 72 | | | | | | | 90 | 74 |

What is claimed is:

1. Binder composition which comprises:
   (A) aluminum phosphate containing from 0 up to about 40 mole % of boron based upon the moles of aluminum and containing a mole ratio of phosphorus to total moles of aluminum and boron of about 2:1 to about 4:1;
   (B) nonpolymeric normally solid polyhydric alcohol soluble in aqueous solutions of the aluminum phosphate, and containing at least 2 adjacent carbon atoms each having directly attached thereto one alcoholic hydroxyl group; and keto tautomers thereof;
   (C) oxygen-containing alkaline earth metal compound containing alkaline earth metal and an oxide, and capable of reacting with the aluminum phosphate; wherein said alkaline earth metal compound includes a free alkaline earth metal oxide or a free alkaline earth metal hydroxide and wherein said oxide or hydroxide has a surface area no greater than about 8.5 m$^2$/gram (measured by the BET procedure); and
   (D) water;
wherein the amount of aluminum phosphate is from about 50 to about 95% by weight based upon the total weight of aluminum phosphate and alkaline earth metal compound; the amount of alkaline earth metal compound is from about 50 to about 5% by weight based upon the total weight of aluminum phosphate and alkaline earth metal compound, the amount of water is from about 15 to about 50% by weight based upon the total weight of aluminum phosphate and water; and the amount of said alcohol is from about 0.5 to about 25% by weight based upon the total weight of aluminum phosphate and alcohol.

2. The binder composition of claim 1 wherein the aluminum phosphate contains a mole ratio of phosphorus to total moles of aluminum and boron of from about 2.5:1 to about 3.5:1.

3. The binder composition of claim 1 wherein the amount of said aluminum phosphate is from about 65 to about 90% by weight based upon the total weight of aluminum phosphate and alkaline earth metal compound, and the amount of alkaline earth metal compound is from about 10 to about 35% by weight based upon the total weight of aluminum phosphate and alkaline earth metal compound.

4. The binder composition of claim 1 wherein said solid polyhydric alcohol contains from about 2 to about 10 carbon atoms.

5. The binder composition of claim 1 wherein said solid polyhydric alcohol contains from about 2 to about 10 hydroxyl groups.

6. The binder composition of claim 1 wherein said solid polyhydric alcohol is sorbitol.

7. The binder composition of claim 1 wherein said solid polyhydric alcohol is dihydroxy succinic acid.

8. The binder composition of claim 1 wherein the amount of polyhydric alcohol is from about 2 to about 15% by weight based upon the total weight of the aluminum phosphate and alcohol.

9. The binder composition of claim 1 wherein said free alkaline earth metal oxide or free alkaline earth metal hydroxide has a surface area no greater than about 3 m$^2$/gram.

10. The binder composition of claim 1 wherein said alkaline earth metal metal compound is a mixture of a free alkaline earth metal oxide and a material which contains the alkaline earth metal and oxide in combination with another constituent and wherein said alkaline earth material has a surface area no greater than about 8.5 m$^2$/gram.

11. The binder composition of claim 10 wherein said alkaline earth metal oxide is magnesium oxide.

12. The binder composition of claim 10 wherein said mixture contains from about 2 to about 8 parts by weight of the free alkaline earth metal oxide per part by weight of the material containing constituents in combination with the free metal oxide and/or hydroxide and alkaline earth metal.

13. The binder composition of claim 1 wherein the amount of water is from about 20 to about 40% by weight based upon the total weight of the aluminum phosphate and water.

14. Molding composition which comprises:
   (A) a major amount of aggregate; and
   (B) an effective bonding amount up to about 40% by weight of the aggregate of the binder composition of claim 1.

15. The binder composition of claim 1 which consists essentially of:
  (A) aluminum phosphate containing between about 10 and about 25 mole % boron based upon the moles of aluminum, and containing a mole ratio of phosphorus to total moles of aluminum and boron of from about 2.5:1 to about 3.5:1;
  (B) solid polyhydric alcohol is selected from the group consisting of sorbitol, sucrose, invert sugar, D-glucose, β-glucose, dihydroxy succinic acid, gluconic acid, 1,2,6-hexanetriol, and mixtures thereof;
  (C) oxygen-containing alkaline earth metal compound being a mixture of from about 2 to about 8 parts by weight of magnesium oxide having a surface area no greater than about 3 m$^2$/gram (measured by the BET procedure) per part by weight of calcium aluminate having a surface area no greater than about 8.5 m$^2$/gram (measured by the BET procedure); and
  (D) water;
wherein the amount of aluminum phosphate is from about 65 to about 90% by weight based upon the total weight of aluminum phosphate and alkaline earth metal compound, the amount of alkaline earth metal compound is from about 10 to about 35% by weight based upon the total weight of aluminum phosphate and alkaline earth metal compound; the amount of water is from about 20 to about 40% by weight based upon the total weight of aluminum phosphate and water; and the amount of said alcohol is from about 2 to about 15% by weight based upon the total weight of the aluminum phosphate and alcohol.

16. The molding composition of claim 14 being an ordinary foundry shape wherein the amount of binder composition is up to about 10% by weight.

17. The molding composition of claim 16 wherein at least about 90% by weight of the aggregate has an average particle size between about 50 and about 150 mesh and wherein at least 85% by weight of the aggregate is silicon sand.

18. The molding composition of claim 16 wherein said aluminum phosphate contains boron in an amount between about 10 and about 25 mole % based upon the moles of aluminum, and wherein the mole ratio of phosphorus to total moles of aluminum and boron is between about 2.5:1 to about 3.5:1.

19. The molding composition of claim 16 wherein the amount of said aluminum phosphate is from about 65 to about 90% by weight based upon the total weight of aluminum phosphate and alkaline earth metal compound, and the amount of alkaline earth metal compound is from about 10 to about 35% by weight based upon the total weight of aluminum phosphate and alkaline earth metal compound; the amount of polyhydric alcohol is from about 2 to about 15% by weight based upon the total weight of the aluminum phosphate and alcohol; and wherein the amount of water is from about 20 to about 40% by weight based upon the total weight of the aluminum phosphate and water.

20. The molding composition of claim 16 wherein said polyhydric alcohol is selected from the group consisting of sorbitol, sucrose, invert sugar, D-glucose, β-glucose, dihydroxy succinic acid, gluconic acid, 1,2,6-hexanetriol, and mixtures thereof.

21. The molding composition of claim 16 wherein said alkaline earth metal compound is a mixture of a free alkaline earth metal oxide and a material which contains the alkaline earth metal and oxide in combination with another constituent and wherein said alkaline earth metal compound has a surface area no greater than about 8.5 m$^2$/gram.

22. A method for preparing the molding composition of claim 14 which comprises admixing the alkaline earth metal compound with said aggregate; and then admixing the aluminum phosphate, solid polyhydric alcohol and water with the composition containing the aggregate and alkaline earth metal compound.

23. A two-package system capable of curing at ambient temperature consisting essentially of:
  containing in a first packet a curable composition of:
  (A) aluminum phosphate containing 0 to about 40 mole % of boron based upon the moles of aluminum and containing a mole ratio of phosphorus to total moles of aluminum and boron of about 2:1 to about 4:1,
  (B) nonpolymeric normally solid polyhydric alcohol being soluble in aqueous solutions of the aluminum phosphate, and containing at least 2 adjacent carbon atoms each having directly attached thereto one alcoholic hydroxyl group; and keto tautomers thereof; and
  (C) water; wherein the amount of aluminum phosphate is from about 50 to about 85% by weight based upon the total weight of aluminum phosphate and water; the amount of water is from about 15 to about 50% by weight based upon the total weight of the aluminum phosphate and water; and the amount of the solid polyhydric alcohol is from about 0.5 to about 25% by weight based upon the total weight of aluminum phosphate and solid polyhydric alcohol; and
  containing in a second package a hardening agent for the curable composition in said first package being an oxygen-containing alkaline earth metal compound containing alkaline earth metal and an oxide wherein the amount of the alkaline earth metal compound is from about 50 to about 5% by weight based upon the total weight of the aluminum phosphate and alkaline earth metal compound.

24. Binder composition which comprises:
  (A) aluminum phosphate containing from 3 up to about 40 mole % of boron based upon the moles of aluminum and containing a mole ratio of phosphorus to total moles of aluminum and boron of about 2:1 to about 4:1;
  (B) normally solid polyhydric alcohol soluble in aqueous solutions of the aluminum phosphate, and containing at least 2 adjacent carbon atoms each having directly attached thereto one alcoholic hydroxyl group; and keto tautomers thereof;
  (C) oxygen-containing alkaline earth metal compound containing alkaline earth metal and an oxide, and capable of reacting with the aluminum phosphate; and
  (D) water;
wherein the amount of aluminum phosphate is from about 50 to about 95% by weight based upon the total weight of aluminum phosphate and alkaline earth metal compound; the amount of alkaline earth metal compound is from about 50 to about 5% by weight based upon the total weight of aluminum phosphate and alkaline earth metal compound, the amount of water is from about 15 to about 50% by weight based upon the total weight of aluminum phosphate and water; and the amount of said alcohol is from about 0.5 to about 25% by weight based upon the total weight of aluminum phosphate and alcohol.

25. The binder composition of claim 24 wherein said aluminum phosphate contains boron in an amount from about 3 to about 30 mole % based upon the moles of aluminum.

26. The binder composition of claim 24 wherein said aluminum phosphate contains boron in an amount from about 5 to about 30 mole % based upon the moles of aluminum.

27. The binder composition of claim 24 wherein said aluminum phosphate contains boron in an amount from about 10 to about 25 mole % based upon the moles of aluminum.

28. The binder composition of claim 24 wherein the aluminum phosphate contains a mole ratio of phosphorus to total moles of aluminum and boron of from about 2.5:1 to about 3.5:1.

29. The binder composition of claim 24 wherein the aluminum phosphate contains a mole ratio of phosphorus to total moles of aluminum and boron of from about 2.8:1 to about 3.2:1.

30. The binder composition of claim 24 wherein said aluminum phosphate contains boron in an amount between about 10 and about 25 mole % based upon the moles of aluminum, and wherein the mole ratio of phosphorus to total moles of aluminum and boron is between about 2.8:1 to about 3.2:1.

31. The binder composition of claim 24 wherein the amount of said aluminum phosphate is from about 65 to about 90% by weight based upon the total weight of aluminum phosphate and alkaline earth material, and the amount of alkaline earth material is from about 10 to about 35% by weight based upon the total weight of aluminum phosphate and alkaline earth material.

32. The binder composition of claim 24 wherein said solid polyhydric alcohol contains 2 to about 20 carbon atoms.

33. The binder composition of claim 24 wherein said polyhydric alcohol contains from about 2 to about 10 carbon atoms.

34. The binder composition of claim 24 wherein said polyhydric alcohol contains from about 2 to about 20 hydroxyl groups.

35. The binder composition of claim 24 wherein said solid polyhydric alcohol contains from about 2 to about 10 hydroxyl groups.

36. The binder composition of claim 24 wherein the amount of polyhydric alcohol is from about 2 to about 15% by weight based upon the total weight of the aluminum phosphate and alcohol.

37. The binder composition of claim 24 wherein said alkaline earth material includes a free alkaline earth metal oxide or a free alkaline earth metal hydroxide and wherein said oxide or hydroxide has a surface area no greater than about 8.5 m$^2$/gram (measured by the BET procedure).

38. The binder composition of claim 37 wherein said alkaline earth metal oxide or free alkaline earth metal hydroxide has a surface area no greater than about 3 m$^2$/gram.

39. The binder composition of claim 24 wherein said alkaline earth metal material is a mixture of a free alkaline earth metal oxide and a material which contains the alkaline earth metal and oxide in combination with another constituent and wherein said alkaline earth material has a surface area no greater than about 8.5 m$^2$/gram.

40. The binder composition of claim 39 wherein said alkaline earth metal oxide is magnesium oxide.

41. The binder composition of claim 39 wherein said mixture contains from about 2 to about 8 parts by weight of the free alkaline earth metal oxide per part by weight of the material containing constituents in combination with the free metal oxide and/or hydroxide and alkaline earth metal.

42. The binder composition of claim 24 wherein the amount of water is from about 20 to about 40% by weight based upon the total weight of the aluminum phosphate and water.

43. Molding composition which comprises:
   (A) a major amount of aggregate; and
   (B) an effective bonding amount up to about 40% by weight of the aggregate of the binder composition of claim 24.

44. The molding composition of claim 43 wherein said aluminum phosphate contains boron in an amount between about 10 and about 25 mole % based upon the moles of aluminum, and wherein the mole ratio of phosphorus to total moles of aluminum and boron is between about 2.5:1 to about 3.5:1.

45. The binder composition of claim 1 wherein said solid polyhydric alcohol is invert sugar.

46. The binder composition of claim 1 wherein said solid polyhydric alcohol is 1,2,6-hexane triol.

47. The binder composition of claim 1 wherein said solid polyhydric alcohol is sucrose.

* * * * *